United States Patent [19]

Schnier

[11] 4,164,281
[45] Aug. 14, 1979

[54] SPOTTING MACHINE

[75] Inventor: Edward A. Schnier, Hubbardston, Mass.

[73] Assignee: A-T-O, Inc., Cleveland, Ohio

[21] Appl. No.: 791,230

[22] Filed: Apr. 27, 1977

[51] Int. Cl.² ............................................. B65G 47/24
[52] U.S. Cl. ................................... 198/394; 198/415
[58] Field of Search ................................ 198/394, 415

[56] References Cited

U.S. PATENT DOCUMENTS

| 2,159,318 | 5/1939 | Carter | 198/394 |
|---|---|---|---|
| 2,614,681 | 10/1952 | Keil | 198/394 |
| 2,706,031 | 4/1955 | Capstack et al. | 198/394 |
| 2,825,442 | 3/1958 | Carter | 198/394 |
| 2,873,842 | 2/1959 | Erickson | 198/394 |
| 3,101,836 | 8/1963 | Rountree, Jr. | 198/415 |
| 3,557,933 | 1/1971 | Sopher | 198/394 |

*Primary Examiner*—Robert B. Reeves
*Assistant Examiner*—Jeffrey V. Nase

*Attorney, Agent, or Firm*—Dike, Bronstein, Roberts, Cushman & Pfund

[57] ABSTRACT

Spotting instrumentalities for turning containers traveling along a predetermined path on a conveyor comprising, at opposite sides of the conveyor, a pair of drive rolls and a pair of idler rolls, said pairs of rolls being movable linearly along said path and, while being so moved, rotatable about axes parallel to the vertical axis of the container, said drive rolls being driven in rotation to rotate the container and said idler rolls being freely rotatable and a positioning dog operable by engagement with the positioning element on the side of the container to stop rotation of the container at a predetermined position of orientation. The drive rolls are provided with traction elements adapted to slip when rotation of the container is stopped by the positioning element and the idler rolls are provided with guide elements adapted to be displaced laterally by out-of-round containers and/or irregularities in the surfaces of the containers.

24 Claims, 22 Drawing Figures

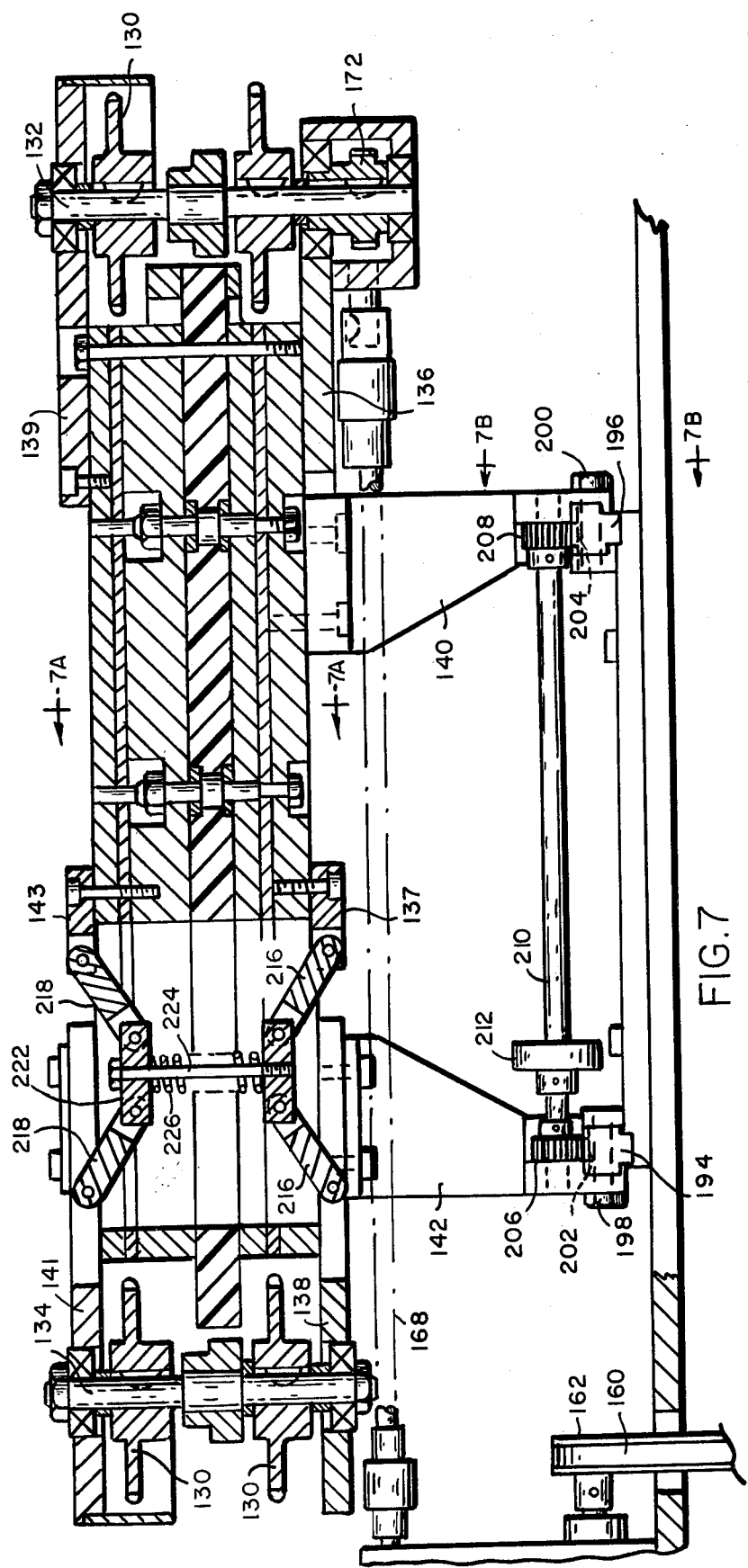
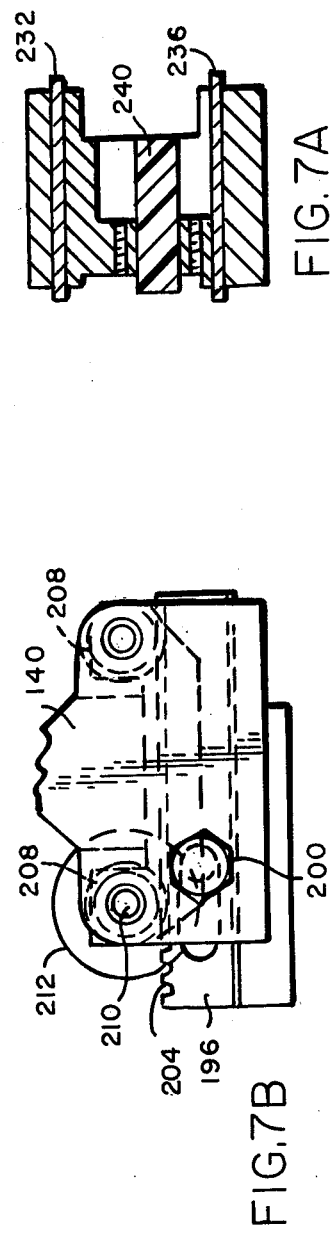

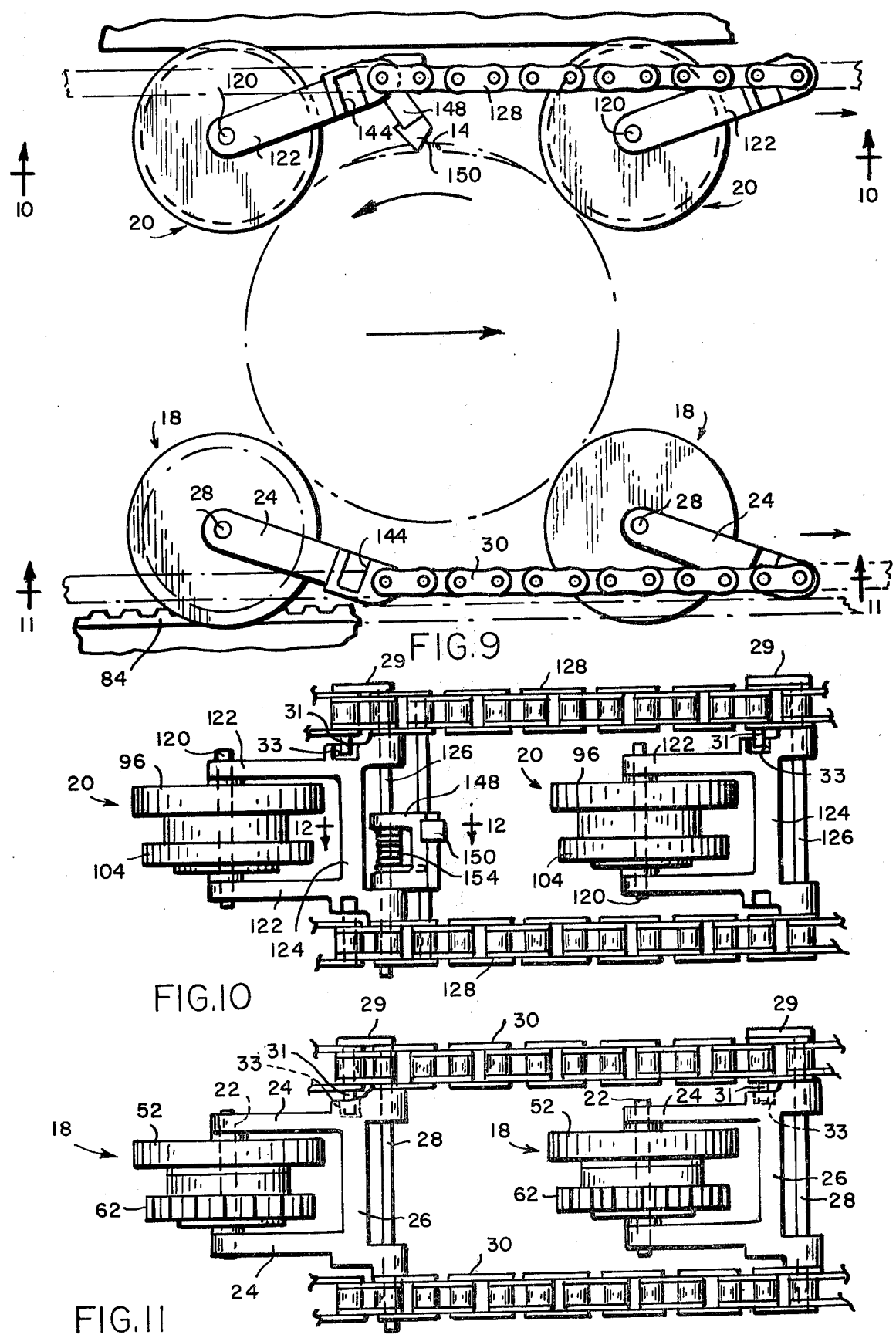

SPOTTING MACHINE

BACKGROUND OF THE INVENTION

The spotting means of this invention embodies, in combination, a number of improvements which have been desired, but not available, in prior spotting apparatus and, in particular, spotting apparatus wherein the means for rotating the containers will not mark the surfaces of the containers when the latter are stopped, spotting apparatus which will allow for out-of-round or irregular surfaces without binding, spotting apparatus which travels linearly with the containers a sufficient distance to enable turning the containers to their proper positions of orientation regardless of their initial positions, spotting apparatus which permits adjustment of the speed of turning of the containers relative to their rectilinear movement and spotting apparatus which can be adjusted to accommodate containers of different size, the aforesaid combination comprising a unitary structure adapted to be interposed in line with feeding screws at one end by means of which the containers are delivered thereto in spaced relation, and labeling means at the other end to which the oriented containers are delivered.

SUMMARY OF THE INVENTION

The spotting apparatus of this invention is designed to be interposed between a pair of feed screws by means of which the containers are delivered thereto in spaced relation and labeling apparatus to which the containers oriented by the spotting apparatus are delivered and comprises, in combination with a conveyor for moving the containers along a predetermined path, means at the opposite sides of the conveyor movable along said path, for turning the containers as they travel therealong to predetermined positions of orientation. The aforesaid turning means are designed to slip when rotation of the containers are stopped by spotting elements on the containers provided for this purpose and to provide for out-of-round and/or irregular surface containers without binding and comprise at one side drive rolls embodying friction engendering elements which, by engagement with the sides of the containers, effect rotation of the containers, said elements being adapted to slip relative to the idler rolls when the containers are prevented from rotation and idler rolls at the other side embodying elements which, by engagement with the sides of the containers, hold them upright, said elements being adapted to yield laterally when encountering an out-of-round or irregular shaped container. The drive rolls and the idler rolls are attached to chains by means of which they are moved linearly along the path of movement of the container, a drive belt effects rotation of the drive rolls during such linear movement and there is means for adjusting the rate of travel of the drive belt relative to the chains to increase or decrease the rate of rotation of the drive rolls. The drive rolls, together with the means for moving them linearly along the path and the means for effecting their rotation, and the idler rolls, together with the means for moving them along the linear path and the means for permitting their yield, are mounted on supporting structures which are movable transversely with respect to the path of travel so that the transverse distance between the pair of drive rolls and the pair of idler rolls can be adjusted for containers of different diameter. Additionally, there is means for initially adjusting the chains relative to each other and, hence, the positions of the pairs of rolls relative to each other and means for adjusting the tautness in the drive belt.

The invention will now be described with reference to the accompanying drawings, wherein:

FIG. 7 is a longitudinal vertical section taken on the line 7—7 of FIG. 4;

FIG. 7A is a section taken on the line 7A—7A of FIG. 7;

FIG. 7B is an elevation taken on the line 7B—7B of FIG. 7;

FIG. 9 is an enlarged fragmentary plan view of the spotting means;

FIG. 10 is a fragmentary elevation taken on the line 10—10 of FIG. 9;

FIG. 11 is a fragmentary elevation taken on the line 11—11 of FIG. 9;

Prior to applying labels to containers, it is necessary to orient the containers all in the same direction so that the labels will be applied by the labeling apparatus to the same side and in the same position to successive containers. Such apparatus known as spotting means precedes the labeling apparatus and the containers are delivered thereto at a uniformly predetermined spacing by means of a conveyor 10 as shown in FIGS. 1 and 2 upon which the containers are moved standing upright from a feed screw drive, not shown herein, which spaces the containers on the conveyor, the conveyor operating to move the spaced containers through the spotting apparatus indicated generally at 12, FIG. 1, where the containers are oriented and from thence to the labeling apparatus, not shown herein.

Figure 18:
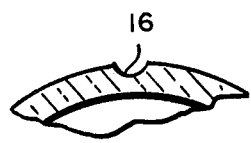
FIG. 18 shows a fragmentary portion of a container provided with a depressed spotting element.

The spotting apparatus is designed, as will be described hereinafter, to turn a container resting on the conveyor 10 as it travels from one end of the zone of operation of the spotter to the other, to the proper position for labeling from whatever position the container originally occupied at the time that it moved into the sphere of operation of the spotter. For spotting, of course, each container has on its vertical surface either a protruding spotting nub 14 as shown in FIGS. 1, 4, 8 and 9, or a depressed spotting bar 16 as shown in FIG. 18.

Figure 1:
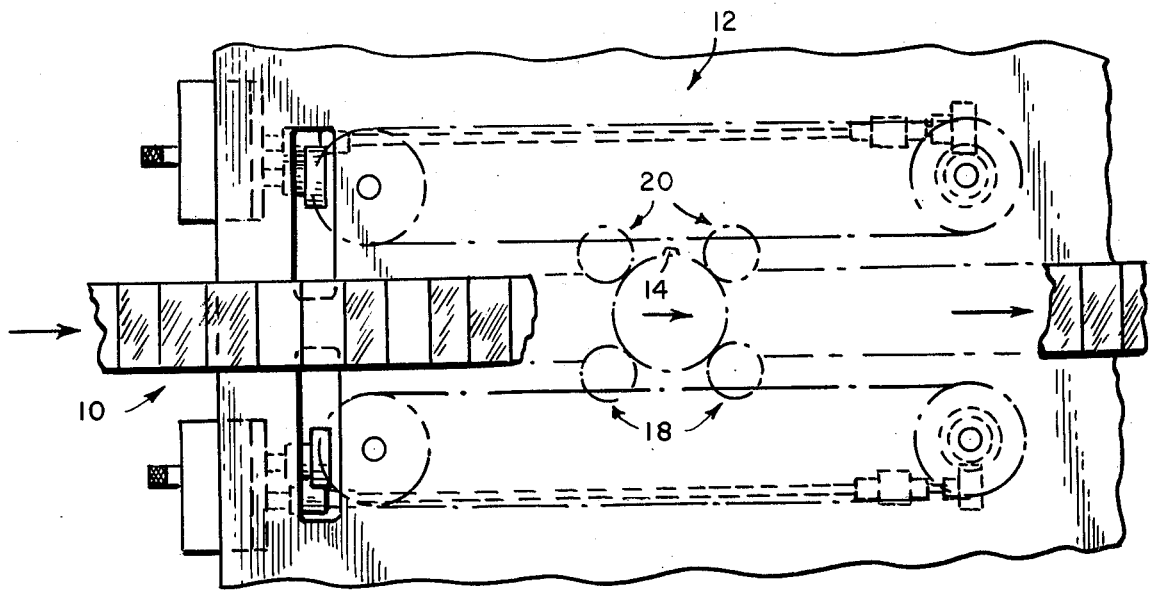
FIG. 1 is a plan view of the spotting apparatus herein described showing portions of the conveyor for moving the containers along and diagrammatically showing the spotting means and the drive therefor.
Figure 2:
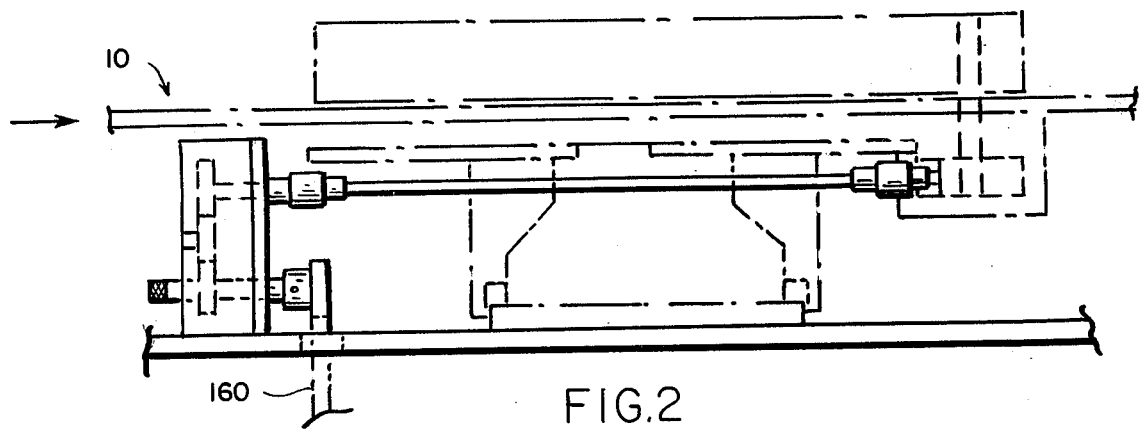
FIG. 2 is an elevation of FIG. 1.
Figure 4:
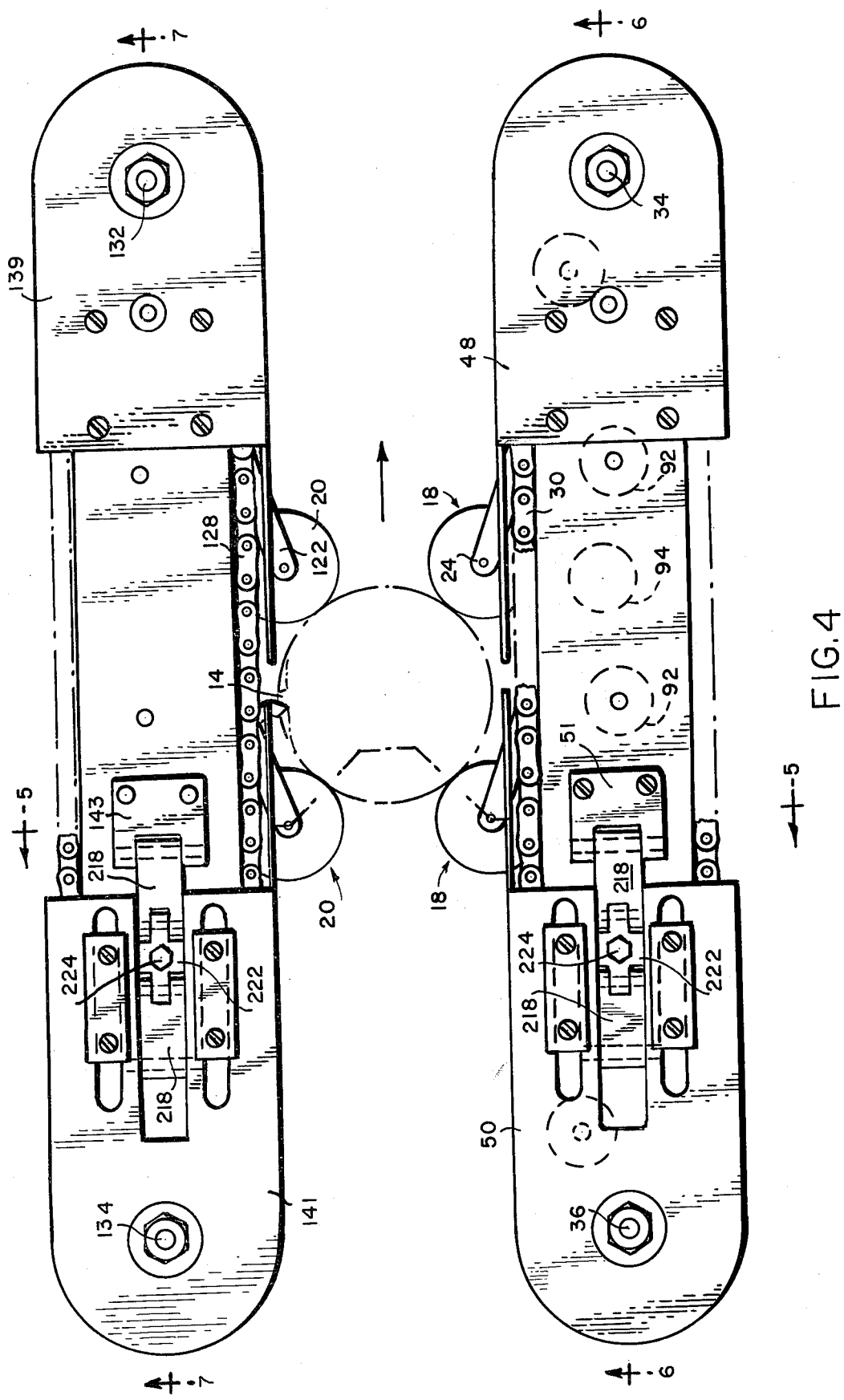
FIG. 4 is a plan view of the spotting apparatus to a larger scale.

The spotting means as illustrated, FIGS. 1, 4 and 9, comprise drive rolls 18—18 at one side of the path of movement of the conveyor 10 and idler rolls 20—20 at the opposite side of the path of movement of the conveyor arranged substantially quadrangularly for rotation about a vertical axes, for movement rectilinearly along the path of travel of the conveyor and for arcuate movement about vertical axes in a horizontal plane parallel to the conveyor toward and from the longitudinal center line of the conveyor.

Figures 6, 6A:
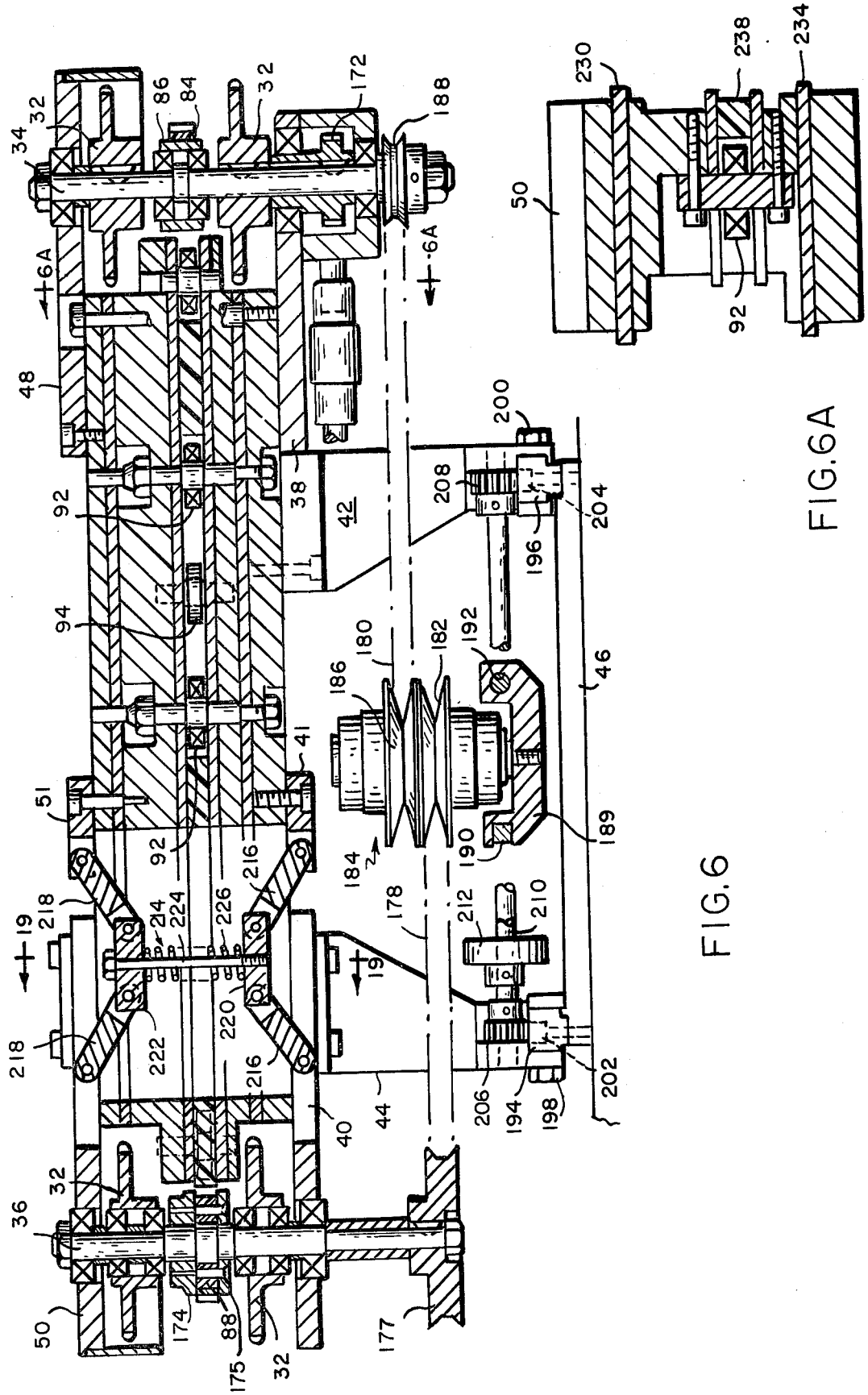
FIG. 6 is a longitudinal vertical section taken on the line 6—6 of FIG. 4.
FIG. 6A is a section taken on the line 6A—6A of FIG. 6.

The drive rolls 18—18 are supported above the surface of the conveyor 10 so as to have engagement with the sides of the containers substantially midway between the bottoms and the tops on vertically disposed pins 22, FIG. 11, journaled in the distal ends of vertically spaced arms 24—24 of a bracket 26 which is pivotally supported on a vertically disposed spindle 28, the upper and lower ends of which are rotatively fixed within the links of vertically spaced, horizontally disposed endless chains 30—30 entrained at their opposite ends about vertically spaced sprockets 32—32, FIG. 6, keyed to a vertically disposed shaft 34 at one end and free to turn on a vertically disposed shaft 36 at the other end. An arm 29 is fixed to the upper end of each spindle 28 parallel to the chain links and has fixed to its distal end a pin 31 which extends downwardly therefrom into a recess 33 in the bracket 26. The shafts 34 and 36 are journaled at their lower ends in longitudinally disposed, horizontal bench plates 38 and 40. The bench plate 40 is slidably fixed to a bench 44 and the bench plate 38 is nonslidably fixed to the bench 42. The benches 42 and 44 are supported for movement in unison transversely of the center line of the conveyor on a base plate 46, as will be described in greater detail hereinafter. The upper ends of the shafts 34 and 36 are journaled in cover plates 48 and 50 mounted above the bench plates at a sufficient height therefrom to accommodate the chains 30—30 therebetween and as well the drive rolls and means for effecting rotation of the drive rolls. The cover plate 48 is fixed with respect to the bench 42 whereas the cover plate 50 is longitudinally movable with respect to the bench plate 40 relative to the bench 44.

Figure 14:
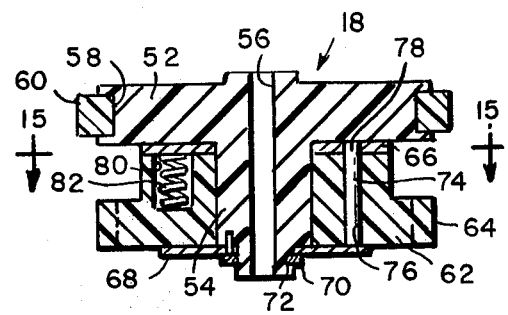
FIG. 14 is a diametral section through a drive roll.
Figure 15:
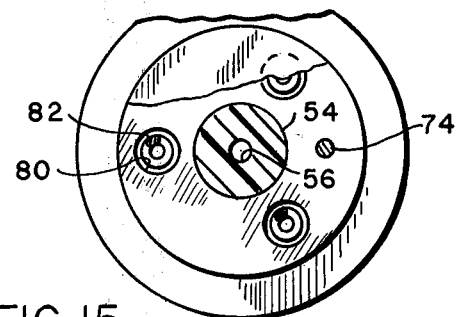
FIG. 15 is a view taken on the line 15—15 of FIG. 14.

Each of the drive rolls 18, FIGS. 14 and 15, comprise a circular disk 52 provided with a hub 54 at its center containing an axial hole 56 by means of which it is rotatably mounted on the pin 22. The peripheral surface of the disk 52 contains an annular groove 58 in which is mounted a tire 60 of friction engendering material for engagement with the side of the container so that rotation of the drive wheel through frictional engagement of the tire 60 will effect rotation of the container. For rotating the disk 52, a gear 62 provided with teeth 64 is mounted on the hub 54 against a friction disk 66 by means of a retaining washer 68 secured to the hub by means of a lock washer 70 set into a groove 72 on the hub. A pin 74 extending through an axial opening 76 in the gear into engagement with a hole 78 in the friction disk 66 provides for rotation of the friction disk with the gear 62 and for transmission of the rotation of the gear 62 to the disk 52 through the intermediary of the friction disk 66. It is desirable that after the container has been rotated to a position of proper orientation by engagement of the spotting nub or bar with a positioning dog which will be described hereinafter, to have the drive disk 52 slip with respect to the driving gear 62 so that it will not form a mark on the surface of the container as it would be if it was forced to continue to rotate relative to the container after the latter was stopped by the positioning dog. The slip is achieved herein by providing in the gear 62 three peripherally disposed, axially extending holes 80 within which are mounted coil springs 82 which, by engagement with the friction disk 66, force the latter against the disk 52 with sufficient pressure to effect the drive necessary to rotate the containers until the spotting means engages the positioning dog and then to allow the disk to return freely within the gear 62.

Figure 5:
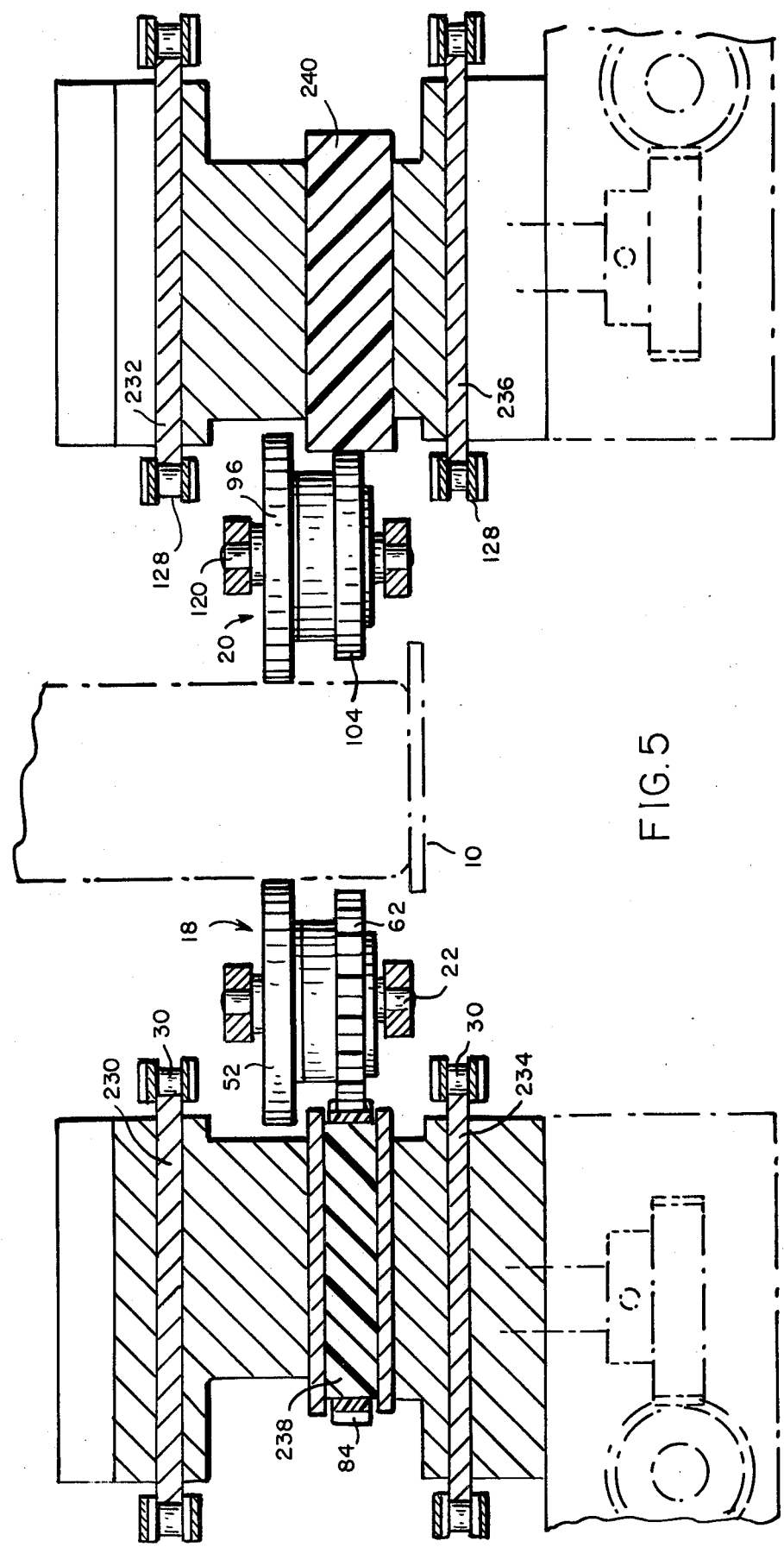
FIG. 5 is a transverse vertical section taken on the line 5—5 of FIG. 4.
Figure 8:
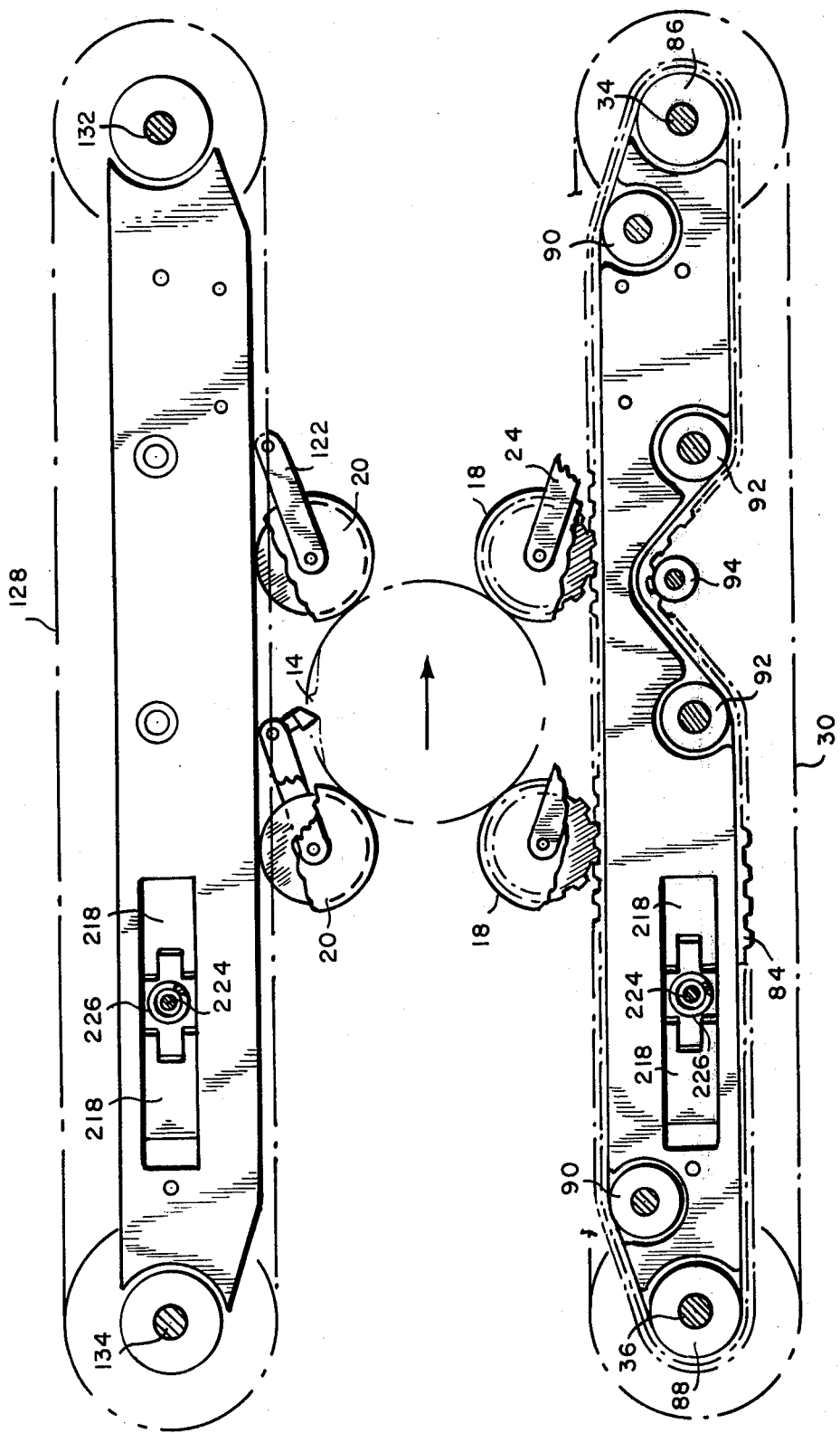
FIG. 8 is a plan view with parts shown in section similar to that shown in FIG. 4 taken in a horizontal plane of the line 8—8 of FIGS. 6 and 7.
Figure 12:
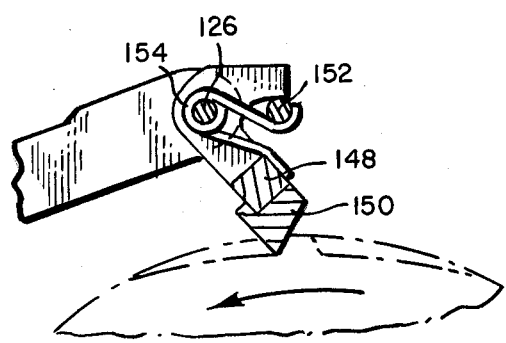
FIG. 12 is a fragmentary plan view of the positioning dog taken on the line 12—12 of FIG. 10.
Figure 13:
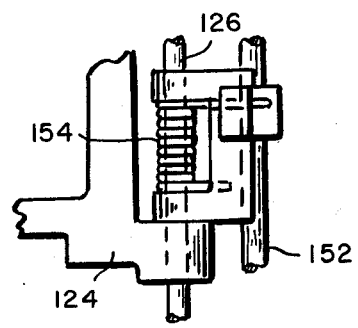
FIG. 13 is a fragmentary elevation of FIG. 12.

Rotation of the gear 62 and, hence, the drive disk 52, is effected by an endless belt 84, as shown in FIGS. 5, 8 and 9, supported in a horizontal plane midway between the chains 30—30 on longitudinally spaced sheaves 86 and 88, FIG. 6, respectively, freely rotatable on the shaft 34 and fixed to the shaft 36. Intermediate the sheaves 86 and 88, there are at the inner side of the belt with respect to the conveyor idler rolls 90—90, FIG. 8, and at the outer side idler rolls 92—92 and a takeup roll 94. All of the aforesaid rolls are mounted on the frame for free rotation about vertical axes. As thus constructed, the belt 84, when driven by rotation of the sheave 88, will produce rotation of the drive rolls 18 as they travel linearly along the path of movement with the chains 30—30.

Figure 16:
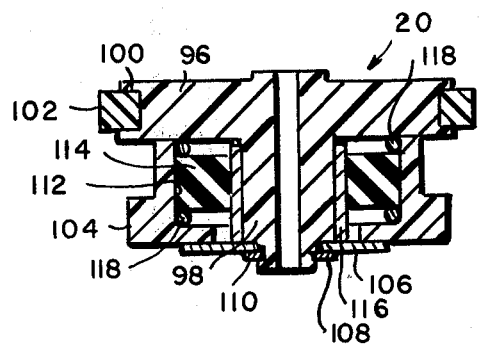
FIG. 16 is a diametral section of an idler roll.
Figure 19:
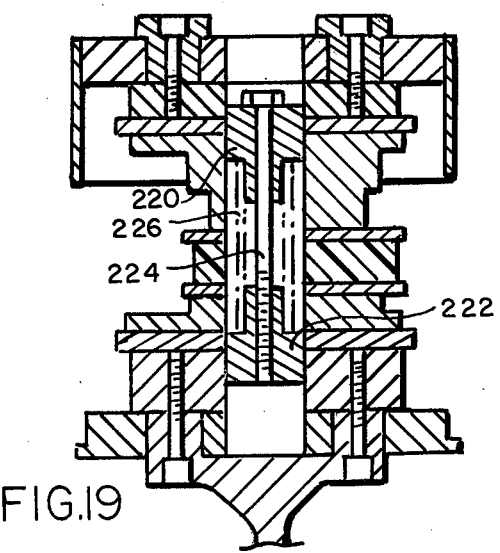
FIG. 19 is a section taken on the line 19—19 of FIG. 6.

In order to hold the containers upright during rotation as they are moved along the path of travel, there are provided idler rolls 20—20, FIGS. 5, 8 and 9, each of which is so designed as to provide for a limited amount of lateral movement as a container is rotated by the drive rolls to compensate for slight irregularities in the surface of the container and therefore to avoid jamming the container so hard as to interfere with its free rotation. As illustrated in FIG. 16, each idler roll 20 comprises a circular disk 96 provided with a hub 98. The peripheral surface of the disk contains an annular groove 100 in which there is mounted a tire 102. The tire 102 is comprised of a friction engendering material like that of the tire 60 so that it will be rotated by engagement of the surface of the container therewith and thus contribute to smooth rotation of the container. To provide for the lateral displacement of the disk 96 relative to its axis of rotation and to hold the disk 96 in engagement with the surface of the container, a follower 104 is mounted on the hub in concentric relation to the axis of rotation thereof by means of a washer 106 set into a groove 108 in the hub and retained therein by a lock washer 110. The follower 104 contains an axial opening 112 of larger diameter than the hub 98 and a plurality of cylindrical bearing elements 114 comprised of a yieldable material mounted within the space between the hub and the inside opening 112. A sleeve 116 is provided about the hub for the bearing elements 114 to roll on and O-rings 118—118 are provided at the ends of the bearing element to maintain their axial position. As thus constructed, the disk 96 is movable laterally with respect to the follower 104, if pressure is exerted radially with respect to its axis of rotation.

The idler rolls 20—20 are mounted to travel along the path of movement of the containers in consonance with the drive rolls 18—18 and to this end are rotatably supported on vertically disposed pins 120—120, FIGS.

5 and 10, journaled at their upper and lower ends in vertically spaced arms 122—122 on brackets 124—124 which are rotatably supported on vertically disposed spindles 126—126 fixed at their opposite ends in vertically disposed, spaced, parallel, endless chains 128—128. An arm 29 is fixed to the upper end of each spindle 126 parallel to the chain links which has at its distal end a pin 31 which extends downwardly therefrom into a recess 33 in the bracket 124. The chains 128—128 are entrained at their ends about vertically spaced sprockets 130—130, FIG. 7, mounted on vertically spaced shafts 132 and 134. The sprockets 130—130 at the one end are keyed to the shafts 132 and at the other end keyed to the shaft 134. The shafts 132-134 are journaled at their lower ends in bench plates 136 and 138. The bench plate 136 is bolted to a bench 140 and the bench plate 138 is slidably attached to a bench 142. The benches 140 and 142 are movable transversely with respect to the path of movement of the conveyor. The idler rolls, as indicated above, are not driven in rotation, but do turn about their axis as the container is rotated by the drive rolls.

Each of the rolls, that is, both drive rolls and both idler rolls, as supported by the bracket members 26 and 124, are movable in an arc about the axis of their supporting spindles 28 and 126 relative to the inner sides of the conveyor chains 30—30 on the one side and the conveyor chains 128—128 on the other side toward and away from the center line of the conveyor. The pins 31, by engagement with the recesses 33, limits such pivotal movement as the brackets travel around the outer sides of the chains so that they will not swing outwardly from the chains.

The positioning means for limiting rotation of the containers to a predetermined position of orientation comprises, as shown in FIGS. 9, 10, 12 and 13, a dog 148 provided with a hard rubber tip 150 for engagement with the hub or bar in the container, the dog being pivotally mounted for pivotal movement about a vertical axis on the spindle 126 and yieldably biased inwardly toward the container situated between the drive and idler rolls by a coiled spring 154 mounted on the spindle 126. To hold the coil spring 154 in tension, its opposite ends are coiled about a spindle 152 fixed at its ends to the chains 128—128.

Figure 3:
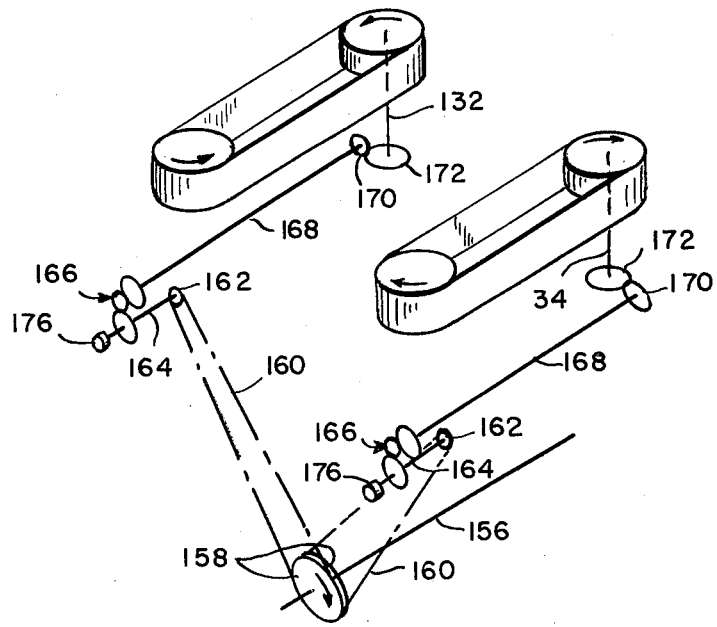
FIG. 3 is an isometric diagrammatically showing the drive for the spotting means.
Figure 17:
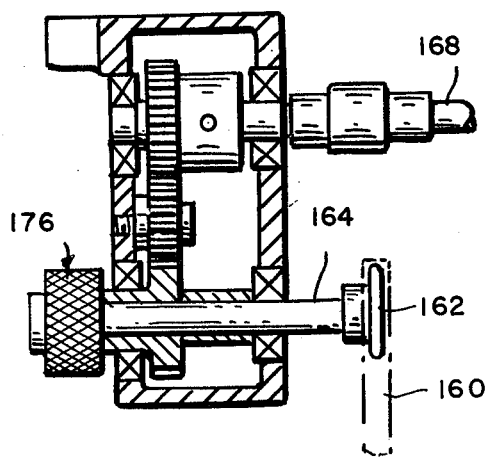
FIG. 17 is a fragmentary section illustrating the drive from the main drive shaft of the machine.

The drive for the chains 30—30 and 128—128 and for the belt 84 is the main drive shaft 156, FIG. 3, by way of sprockets 158—158 fixed to the main drive shaft, and endless chains 160—160 entrained at one end about the sprockets 158 and at their other ends about sprockets 162—162 fixed to countershafts 164—164. The countershafts 164—164, through trains of gears 166—166, drive shafts 168—168, the latter being provided at their opposite ends with spiral gears 170—170 which mesh with spiral gears 172—172 keyed to the lower ends of the shafts 34 and 132. The train of gears 166—166 provide for indexing the chains 30—30 and 128—128 relative to each other so that the drive rolls and idler rolls are properly located and moved in consonance with each other. This is achieved by providing indexing heads 176—176 FIG. 17, on each countershaft 164—164 so as to enable rotating the shafts 168—168 and, hence, the spiral gears 172—172 to bring the chains into proper relation to each other. The sprockets 32—32 at the one end are keyed to the shaft 35 and the sprockets 32—32 at the opposite end are free to turn on the shaft 36 as previously related and so the chains 30—30 are driven by rotation of the shaft 34. The sheave 86 turns on the shaft 34. However, the sheave 88 is keyed to the shaft 36. A collar 174 above and a collar 175 below act as guides for the belt 84. The belt is driven by frictional engagement with the sheave 88. The belt 84 will slip on the sheave in emergency, thus making a friction clutch unnecessary. Rotation of the shaft 36 is achieved by means of a pulley 177 fastened to its lower end and by belts 178 and 180, the belt 178 being entrained at its ends on the pulley 177 and a pulley 182 of a speed change device 184 and the belt 180 being entrained at its ends about a pulley 186 of the speed change device and a pulley 188 fixed to the lower end of the shaft 34. The speed change device 184 is of the kind that provides for increasing and decreasing the effective diameters of the pulleys 182 and 186, to thus adjust the speed of rotation of the pulley 177 and shaft 36 and, hence, the drive of the belt 84. By such adjustment, the rate of rotation of the container relative to its linear movement along the path of movement can be changed for different size containers to thus accommodate the apparatus to spotting containers of different diameter. The speed change device is mounted to a support 189, FIG. 6, which, in turn, is mounted for movement transversely with respect to the path of travel of the conveyor on a transversely extending slide bar 190 at one longitudinal side and a spindle 192 at the other side.

To adjust the distance between the drive rolls at the one side and the idler rolls at the other side for containers of different size, the benches 42-44, FIG. 6, at the one side and 140-142, FIG. 7, at the other side are slidably mounted on transversely extending rails 194 and 196. The benches may be locked at a predetermined spacing on the rails 194-196 by means of bolts 198-200. For effecting movement of the benches relative to each other transversely of the path of movement, there are provided on the rails 194-196, rack bars 202-204, FIG. 6, with which mesh pinion gears 206-208 fixed to a shaft 210 which is journaled at its ends to the benches. A handle wheel 212 fixed to the shaft 210 provides for rotating the pinions 206-208 and, hence, for traversing the benches.

To provide for tightening the chains 30—30 and 128—128, toggle means 214, FIGS. 6 and 7, is provided between the structure supported by each of the bench means 42-44 and 140-142. The toggle means comprises pairs of arms 216—216 and 218—218. The arms 218—218 are pivotally connected to the plates 50, 51, 141 and 143 and the arms 216—216 are pivotally connected to the plates 40, 41, 138 and 137. At their opposite ends, the arms are connected to vertically spaced, parallel bars 220 and 222 connected by a bolt 224 and held separated by a coil spring 226. Since the plates 138-141 are movable relative to the bench 142 and the plates 40-50 are movable relative to the bench 44, the spring coils 226 will hold the plates 4o-50 and 128-141 distended, thus holding the chains in tension.

In order to guide the chains 30—30 and 128—128, there are provided for the upper chains cam plates 230-232, FIG. 5, and for the lower chains cam plates 234-236 and to guide the belt 84, there is provided a cam member 238 and the idler rolls, a cam member 240.

The indexing heads 176 are commercially available "Shaft Phasing Adjustment" units manufactured by the Harmonic Drive Products of USM Corporation.

It should be understood that the present disclosure is for the purpose of illustration only and includes all modifications or improvements which fall within the scope of the appended claims.

I claim:

1. A spotter for turning containers traveling along a predetermined path to predetermined positions of orientation preparatory to labeling, said containers having spotting means on their side surfaces, comprising means situated at opposite sides of the path of movement for engagement with the containers as the containers travel linearly along said path at quadrilaterally-spaced intervals, said means comprising at one side longitudinally-spaced drive rolls for tangential engagement with the containers at that side and at the other side longitudinally-spaced idler rolls for tangential engagement with the containers at the other side, conveyor means supporting the rolls for movement in unison along said path, for rotation about their centers and for arcuate movement about axes parallel to the axis of the containers, drive means including slip couplings for rotating the drive rolls about their centers while traveling along said path, followers concentric with the axes of the idler rolls, said followers being laterally yieldable relative to the idler rolls to permit the idler rolls to yield to an out-of-round surface while traveling along said path and positioning means movable along said path in consonance with the rolls operable by engagement with the spotting means on the containers to disable the drive through said slip coupling to stop rotation of the containers at said predetermined positions of orientation.

2. Apparatus according to claim 1 comprising tires mounted to the drive rolls for engagement with the side surfaces of the containers.

3. Apparatus according to claim 1 comprising tires mounted to the idler rolls for rolling engagement with the side surfaces of the containers.

4. Spotting apparatus according to claim 1 comprising speed change means for changing the rate of the drive means relative to the predetermined linear movement of the containers along said path.

5. Apparatus according to claim 1 wherein the means supporting the drive rolls and idler rolls for arcuate movement about axes parallel to the axes of the containers comprise arms pivotally supported at one end and inclined rearwardly from their pivotally supported ends with respect to the direction of travel along said path and wherein said rolls are rotatably supported at the distal ends of said arms.

6. Apparatus according to claim 1 wherein the idler rolls comprise wheels having hubs and said followers contain openings for rotatedly receiving the hubs with clearance spaces therebetween and yieldable means situated in the clearance spaces between the inner sides of the openings and the outer sides of the hubs.

7. Apparatus according to claim 6 wherein said yieldable means comprises a plurality of cylindrical bearing members of the elastically deformable material mounted in the clearance spaces between the hubs and the followers.

8. Spotting apparatus comprising in combination with a supporting conveyor for moving containers along a predetermined path, transversely-spaced pairs of longitudinally-spaced rolls, the rolls at one side constituting drive rolls and the rolls at the other side constituting idler rolls, chains at each side of the supporting conveyor, pairs of arms pivotally mounted at one end to the chains for linear movement along said path, means rotatably mounting pairs of rolls to the distal ends of the arms for rotation about vertical axes with their surfaces in tangential engagement with the containers on the supporting conveyor at quadrilaterally-spaced intervals, a belt coextensive with the chain at one side, means on the rolls at that side drivably engaged with said belt such that movement of the belt effects rotation of the rolls, said containers having on their side surfaces spotting means, positioning means supported by the chains at the other side for engagement with the surfaces of the containers embraced by said spaced pairs of rolls in a position to be engaged by the spotting means to stop rotation of the containers, means for driving the chains at a predetermined rate and speed change means for driving the belt independently of the chains at a different rate than the chains.

9. Spotting means according to claim 8 comprising supporting means supporting the chains, belt and rollers at one side and the chains and rollers at the other side for movement relative to each other transversely with respect to the supporting conveyor and means for effecting transverse movement of the supporting means in equal amounts.

10. Spotting means according to claim 9 wherein there are longitudinally spaced shafts mounted on the supporting means at each side, sprockets mounted on the shafts about which the chains and belt are entrained and means for adjusting the spacing of the shafts to maintain tautness in the chains and belt.

11. Spotting means according to claim 9 wherein there are longitudinally spaced shafts mounted on the supporting means at each side, sprocket means mounted on the shafts about which the chains and belt are entrained, said supporting means at each side being divided intermediate their ends and movable longitudinally relative to each other and means for effecting movement of the divided supporting means toward and away from each other equal amounts.

12. Spotting means according to claim 9 wherein there are longitudinally spaced shafts mounted on the supporting means at each side, sprockets mounts on the shafts about which the chains and belt are entrained, the chain sprockets at one end being keyed to the shaft at that end and at the other end free to rotate thereon and the belt sprocket at the other end being fixed to the shaft at that end and at the one end free to turn, means for rotating the shaft at the one end to drive the chains and means for rotating the shaft at the other end for driving the belt.

13. Spotting means according to claim 12 comprising speed change means for rotating the shaft at said other end.

14. Spotting means according to claim 13 comprising means for driving the speed change means from the shaft at the one end.

15. Apparatus for rotating containers traveling along a predetermined path to a predetermined position of orientation, said containers being of the kind having spotting devices on their side surfaces comprising means at opposite sides of the path having engagement with the containers at quadrilaterally-spaced points on their peripheral surfaces, said means at one side of the path of movement constituting drive rolls and at the other side idler rolls, said drive rolls and idler rolls having tangential rolling engagement with the containers, means for rotating the drive rolls at the one side to impart rotation to the containers, said drive rolls comprising wheels provided with friction-engendering tires for engagement with the containers, said wheels having hubs, drivers rotatably mounted on the hubs and means holding the drivers on the hubs, friction disks mounted between the drivers and the faces of the wheels and spring means rotatable with the drivers yieldably pressing the friction disks aginst the faces of the wheels, said idler rolls at the other side being freely rotatable as the containers turn and supporting the containers against overturn and a positioning dog at one side operable by engagement with the spotting means on the containers to stop rotation of the containers at said predetermined position of orientation.

16. Apparatus for rotating containers traveling along a predetermined path to a predetermined position of orientation, said containers being of the kind having spotting means on their side surfaces comprising means at opposite sides of said path having engagement with the containers at quadrilaterally-spaced points on their peripheral surfaces, comprising at one side of the path of movement drive rolls and at the other side idler rolls, said rolls having tangential rolling engagement with the containers, means supporting the drive and idler rolls for movement in unison along said path and for rotation about axes parallel to the axis of the container, means for effecting rotation of the drive rolls to impart rotation to the containers, said drive rolls comprising wheels provided with hubs, concentric drive means mounted on the hubs, friction elements mounted on the hubs between the wheel and the drive means and means for effecting rotation of the friction elements with the drive means and for yieldably pressing the friction elements against the wheels, said idler rolls being free to rotate as the containers turn and supporting the containers against overturn, and a positioning dog at one side operable by engagement with the spotting means on the containers to stop rotation of the containers at said predetermined position of orientation.

17. Apparatus according to claim 16 wherein the drive means are toothed and the means for effecting rotation of the drive rolls is a toothed belt with which the teeth of the drive means are held engaged as the drive rolls travel linearly along said path.

18. Apparatus according to claim 17 comprising a fixed guide parallel to the path of movement which supports the portion of the toothed belt traveling along said path.

19. Apparatus for rotating containers traveling along a predetermined path to a predetermined position of orientation, said containers being of the kind having spotting means on their side surfaces comprising pairs of longitudinally-spaced rolls at opposite sides of said path, endless conveyor chains supported at opposite sides of the path of travel with the runs parallel to the path of travel, arms pivotally mounted at one end to the chains and sloping inwardly therefrom and rearwardly with respect to the direction of movement, means rotatably mounting the rolls to the distal ends of the arms so as to have rolling engagement with the containers, means for driving the chains to move the rolls in unison linearly along said path, the rolls at one side being drive rolls and the rolls at the other side being idler rolls, means for rotating the drive rolls during the linear movement so as to rotate the containers while traveling along said path, and positioning means movable linearly with the rollers operable by engagement with the spotting means to stop rotation of the containers at said predetermined position of orientation.

20. Apparatus according to claim 19 wherein there are means on the arms and the chains limiting pivotal movement of the arms relative to the chains.

21. Apparatus according to claim 19 wherein the means for rotating the drive rolls comprise an endless belt having a run parallel to the path of movement and means on the said drive rolls adapted by engagement with the endless belt to be driven in rotation thereby.

22. Apparatus according to claim 21 comprising means for increasing and decreasing the rate of travel of the endless belt independently of the rate of movement of the endless chains.

23. Apparatus according to claim 22 comprising longitudinally spaced sprockets about which the chains and belt are entrained, shafts to which the sprockets are fixed, means supporting the shafts for adjustment longitudinally relative to each other and means for effecting such adjustment.

24. Apparatus according to claim 19 wherein the means for rotating the drive rolls is an endless toothed belt having a run parallel to the path and toothed means mounted to the drive rolls and concentric therewith in mesh with the endless belt.

* * * * *